Patented Mar. 15, 1932

1,849,647

UNITED STATES PATENT OFFICE

DANIEL E. STRAIN, OF WILMINGTON, DELAWARE, ASSIGNOR TO E. I. DU PONT DE NEMOURS & COMPANY, OF WILMINGTON, DELAWARE, A CORPORATION OF DELAWARE

PRODUCTION OF VINYL ESTERS

No Drawing.    Application filed June 3, 1930. Serial No. 459,123.

This invention relates to the production of vinyl esters. More specifically the invention relates to the production of vinyl esters by the reaction of acetylene with a carboxylic acid in the presence of a catalyst. Still more specifically this invention relates to an improved catalyst for the production of vinyl esters by this method.

This invention is an improvement on the invention disclosed in the application of Dr. H. B. Dykstra, Serial No. 389,098, filed August 28, 1929, on "The preparation of vinyl acetate".

An object of this invention is the improvement of the yield of vinyl ester secured by the reaction of acetylene with a selected carboxylic acid.

This object is accomplished by carrying out the reaction in the presence of ferric sulfate.

In the method described in the above identified case a carboxylic acid is treated with a flow of acetylene at such a rate that absorption is substantially complete in the presence of a catalyst comprising finely divided mercuric sulfate, sulfo-acetic acid, and a carboxylic acid anhydride such as acetic anhydride. During the reaction the temperature of the mixture is maintained below 50° C. and preferably below 20° C. When the carboxylic acid selected is acetic acid, a temperature between 5°–20° C. is advantageous. When the absorption of acetylene ceases, or when it is desired to discontinue the treatment with acetylene, sufficient sodium acetate is added to the reaction mixture to react with the sulfuric acid and the sulfo-acetic acid present. The mixture is then distilled, preferably under reduced pressure, to separate the vinyl ester from the unreacted carboxylic acid. When the acid used is acetic, this method produces yields of vinyl ester, based on the acid consumed, of 50%–60%, and produces corresponding yields when other acids are used.

I have now discovered that the yields of vinyl ester may be increased by carrying out the reaction in the presence of ferric sulfate. In the preparation of vinyl acetate according to this method, yields between 70%–85% are generally secured.

The following examples illustrate the invention but are not to be deemed in any sense limitative.

Example I

Acetylene was introduced with stirring into a mixture of 600 g. glacial acetic acid, 43 g. finely divided mercuric sulfate, 30 g. sulfo-acetic acid, 30 g. acetic anhydride, and 12 g. ferric sulfate at such a rate that absorption was complete. The temperature of the mixture was maintained between 6° and 18° C. The addition of acetylene was continued for four hours, resulting in a gain in weight of 142 g. Fifty grams of anhydrous sodium acetate were added to the reaction product and the whole was fractionally distilled under diminished pressure. The distillate was collected and on further fractionation gave 335 g. vinyl acetate (b. p. 72°–76° C.), 330 g. acetic acid (b. p. 115°–125° C.), and 17 g. ethylidene diacetate (b. p. 160°–170° C.). This is equivalent to a yield of 86% vinyl acetate and 5% ethylidene diacetate, based on the acetic acid consumed.

Example II

To a solution of 44 g. mercuric acetate in 600 g. acetic acid were added with stirring 13 g. of 22% fuming sulfuric acid, 30 g. sulfo-acetic acid, 30 g. acetic anhydride, and 12 g. ferric sulfate. The mixture was treated with acetylene with stirring for four hours at 6°–17° C., bringing about an increase in weight of 138 g. When this reaction product was distilled as in Example I, 312 g. vinyl acetate, 296 g. acetic acid, and 36 g. ethylidene diacetate were obtained. Yields in this case, based on acetic acid consumed, were 72% vinyl acetate and 10% ethylidene diacetate.

Example III

A mixture consisting of 600 g. acetic acid, 43 g. mercuric sulfate, 30 g. sulfo-acetic acid, 30 g. acetic anhydride, and 10 g. ferric sulfate was treated with acetylene with stirring for 5.5 hours at 3°–15° C., resulting in an increase in weight of 142 g. When the reaction product was treated with sodium acetate and distilled as in the preceding examples, 301 g. vinyl acetate, 361 g. acetic acid, and only a trace of ethylidene diacetate were obtained. The yield of vinyl acetate, based on the acetic acid consumed in the reaction, was, therefore, 88% of the theoretical.

The quantity of ferric sulfate used in conjunction with the mercury catalyst may be widely varied but I have discovered that the use of one part of ferric sulfate for every three parts of mercuric sulfate is sufficient to give a marked improvement in the yield.

It is to be noted that it is not necessary to add the acetylene at that rate which will insure its absorption but that it can be added at other velocities, for instance in quantities sufficiently in excess to remove the vinyl acetate from the reaction mixture as it is formed.

An advantage of this invention is the increased yield of vinyl ester.

As many apparently widely different embodiments of this invention may be made without departing from the spirit and scope thereof, it is to be understood that I do not limit myself to the specific embodiments thereof except as defined in the appended claims.

I claim:

1. The method of producing vinyl esters comprising introducing acetylene into a mixture containing a lower fatty acid, mercuric sulfate, sulfo-acetic acid, a fatty acid anhydride at a temperature between about 5° C. and about 50° C. in the presence of ferric sulfate.

2. The method of producing vinyl esters comprising introducing acetylene into a mixture containing a fatty acid, mercury sulfate, sulfo-acetic acid, and an aliphatic carboxylic acid anhydride, at a temperature between about 5° C. and about 20° C. in the presence of ferric sulfate.

3. The method of producing a vinyl acetate comprising introducing acetylene into a mixture of acetic acid, mercuric sulfate, sulfo-acetic acid, and acetic anhydride at a temperature between about 5° C. and about 20° C. in the presence of ferric sulfate.

4. The method of producing vinyl acetate comprising introducing acetylene into a mixture of glacial acetic acid, mercuric sulfate, sulfo-acetic acid, and acetic anhydride, at a temperature between about 5° C. and about 20° C. in the presence of ferric sulfate, destroying the acid portion of the catalyst, and distilling off the vinyl acetate.

5. The method of producing vinyl acetate comprising introducing acetylene into a mixture of about 600 parts of glacial acetic acid, about 43 parts of finely divided mercuric sulfate, about 30 parts of sulfo-acetic acid, and about 30 parts of acetic anhydride, at a temperature between 6° and 18° C. in the presence of about 12 parts of ferric sulfate until absorption is complete, reacting the acids in the catalytic mixture with a basic substance inactive to the other materials in the solution to destroy their activity, and distilling off the vinyl acetate.

6. The method of producing vinyl acetate comprising introducing acetylene with agitation into a mixture of about 600 parts of glacial acetic acid, about 43 parts of finely divided mercuric sulfate, about 30 parts of sulfo-acetic acid, and about 30 parts of acetic anhydride, at a temperature of 6°–18° C. in the presence of about 12 parts of ferric sulfate until absorption is complete, adding about 50 parts of anhydrous sodium acetate, and distilling off the vinyl acetate.

In testimony whereof, I affix my signature.

DANIEL E. STRAIN.